Aug. 16, 1927.

C. S. BRAGG ET AL 1,639,285

POWER ACTUATOR

Original Filed Nov. 1, 1924    3 Sheets-Sheet 1

INVENTORS
Caleb S. Bragg
Victor W. Kliesrath
BY
Louis Prevost Whitaker
ATTORNEY

Aug. 16, 1927.

C. S. BRAGG ET AL 1,639,285

POWER ACTUATOR

Original Filed Nov. 1, 1924    3 Sheets-Sheet 2

Aug. 16, 1927.

C. S. BRAGG ET AL 1,639,285

POWER ACTUATOR

Original Filed Nov. 1, 1924  3 Sheets-Sheet 3

Patented Aug. 16, 1927.

1,639,285

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR.

Original application filed November 1, 1924, Serial No. 747,271. Divided and this application filed March 3, 1926. Serial No. 92,089.

Our invention consists in the novel features hereinafter described, reference being had to the accompanying drawings which illustrate one embodiment of the invention, selected by us for purposes of illustration, and the said invention is fully disclosed in the following description and claims.

Our invention relates to power actuators for use in connection with automotive vehicles operated by or containing an internal combustion engine having a forced feed lubricating system, including a pump and oil circulating passages connected therewith, and it consists in the provision of a power actuator including a cylinder, a piston working therein, an actuated part connected with the piston and reversing valve mechanism, and operator operated means for the reversing valve mechanism, said actuator and its reversing valve mechanism being operatively connected with the forced feed lubricating system of the internal combustion engine, so that the liquid under pressure necessary for the operation of the power actuator is supplied from the lubricating system of the engine under the control of the reversing valve mechanism and its operator operated means.

Practically all motors employed in connection with automotive vehicles, such as passenger cars, motor buses, motor trucks and the like, and many other types of motor propelled vehicles operable on land, in or upon water or in the air, are provided with forced feed lubricating system including an oil pump which pumps the oil continually under a comparatively high pressure substantially thirty pounds or upward, through circulating pipes to the various bearings of the engine, from which the oil finds its way back to a sump or reservoir and is used over and over again. In order to maintain an adequate supply of oil under pressure for lubricating the various bearings under all conditions of the oil, which becomes thin when heated or from use (crank case dilution) and under all conditions of the bearing surfaces, which, when warm, permit a greater amount of oil to pass through them, it is customary to provide a pump of far greater capacity than normally needed and to insert in the pressure line from the pump a by-pass leading back to the sump or reservoir and containing a regulating valve which will open when the predetermined pressure in the circulating lubricating system is obtained, and by-pass the excess oil pumped back to the reservoir or sump.

In carrying our invention into effect, we draw upon the forced feed lubricating system of the engine as a source of power for operating the power actuator. As the operation of the actuator is intermittent and its action and operation extend through very short periods of time, an extremely small quantity of pressure liquid is required to operate it, as compared with the capacity of the pump, and we have ascertained by practical demonstration that the actuator can be operated, in carrying out our invention, by means of oil under pressure from the lubricating system of an ordinary automobile engine without in any way interfering with the operation of the lubricating system or reducing the pressure or the quantity of oil delivered to the motor bearings to such an extent as to in any way impair the proper lubricating action on the engine.

In carrying our invention into effect, we prefer to connect the pressure pipe line leading to the actuator, to the by-pass of the engine lubricating system, so that, as a matter of fact, the oil which is actually used in the operation of the actuator, is excess oil beyond the normal requirements of the lubricating system, and does not impair its efficiency.

In the specific embodiment of our invention herein shown and described, we have gone further for the purpose of preventing possible injury to the engine, and to this end, we prefer to employ in the by-pass of the lubricating system of the engine, an adjustable pressure regulating valve, which we term a safety valve, which is set to open at a predetermined pressure below which it would be undesirable to operate the engine, and a second pressure regulating valve is also provided between the safety valve and the oil reservoir, which is set at the normal pressure usually maintained in such oil circulating systems, the pipe line through the actuator being tapped into the by-pass between said valves. From this construction it follows that so long as the oil circulating system is working properly, there will ordinarily be ample pressure available for the operation of the actuator without in any way diminishing the supply of oil to the engine. In case of complete failure of the oil circulating system, so that there is no pressure of oil to operate the actuator, the piston thereof can be operated by hand, by means of connections between the operator operated part and the piston, providing a limited amount of lost motion, sufficient to operate the reversing valve mechanism, and thus enabling the piston to be positively moved by the operator operated part when this limited amount of lost motion is taken up in either direction. Obviously, the failure of power to operate the actuator imposing upon the operator the necessity of moving the piston by his own physical force, would immediately communicate to the operator a warning that the actuator was not functioning by power and that an examination of the oil reservoir and lubricating system was necessary to prevent injury to the engine which would otherwise result by running it with insufficient lubrication. In case of partial failure of the lubricating system, so as not to wholly destroy the oil pressure in the lubricating system, and where such pressure remains at or falls below that for which the safety valve in the by-pass is set, no pressure would be available for, and no oil would be used by the actuator, and no damage could be done to the motor through the use of the actuator while the driver's attention would immediately be called to this condition. Obviously, in case of a break in the pressure line leading to the actuator, which would result in a failure of the actuator to operate, the driver would also be immediately appraised of this fact in the same manner and would at once take steps to make the necessary repairs.

Our invention also contemplates the employment of a normally open spring actuated valve in the pressure line leading from the by-pass of the oil circulating system to the actuator, constructed to remain open and permit the passage of oil under normal conditions, but effective to instantly close in case of a break in the pressure line leading to the actuator, which would reduce pressure on one side of the valve and permit it to be instantly closed against its spring by the pressure of oil from the circulating system, thereby preventing loss of oil pending the making of necessary repairs. We prefer to employ a power actuator comprising a cylinder, a double acting piston working therein, and valve mechanism for admitting the pressure fluid to either end of the cylinder, that is to say, on either side of the piston, said valve mechanism being so constructed that when it is in neutral position, the pressure fluid is cut off from both ends of the cylinder and at the same time, a communicating by-pass or passage is established, which will permit the oil to flow from one side of the piston to the other, preferably through the piston, to enable the piston to be moved manually without the aid of, or interference from the actuator when the valve mechanism is in neutral position. We also prefer to provide means for normally maintaining the valve mechanism in neutral position and for automatically returning it to neutral position after it has been moved out of neutral position in either direction, so that if for any reason the valve operating mechanism should become broken, there would be no danger of an improper actuation of the piston of the actuator. We also prefer to provide air vents to prevent the formation of partial vacuum on the pressure side of the piston when the valves are in operative position, to cause the movement of the piston and for any reason, such as the stalling of the motor, the oil pressure fails.

Our invention also comprises other novel features hereinafter particularly pointed out in the following description and claims.

In the accompanying drawings which illustrate one embodiment of the invention, selected by us for purposes of illustration, we have shown an installation in an automotive vehicle in which the actuator is employed for the purpose of operating the steering mechanism of the vehicle, but it is obvious that the actuator could readily be employed to effect the operation of any piece of mechanism in or about the vehicle to which the piston of the power actuator was properly connected, as the brake mechanism, clutch mechanism or other movable part. The specific features herein shown and described, which relate to steering mechanism for automotive vehicles, are not specifically claimed herein as they form the subject matter of our prior application for Letters Patent of the United States, filed November 1, 1924, and given Serial No. 747,271, of which this application is a division.

In the accompanying drawings,

Fig. 1 represents a side elevation of a portion of an automobile chassis, the engine, represented diagrammatically, the front wheels and steering mechanism therefor, showing a power actuator for the steering mechanism operatively connected with the forced feed lubricating system of the engine.

Fig. 1$^a$ represents a vertical sectional view on the line 1$^a$—1$^a$ of Fig. 1.

Fig. 2 is a top plan view of the parts illustrated in Fig. 1.

Fig. 3 is a detail sectional view on the line 3—3 of Fig. 1.

Figures 8, 9 and 10 are detail views of valves which we prefer to use in connection with the fluid pressure line.

Fig. 11 is an enlarged detail view illustrating the means for automatically restoring the valves to normal position, shown in Fig. 4.

In the accompanying drawings, 1, represents the chassis of an automotive vehicle which may be of any usual or desired construction, and is provided with steering wheels, indicated at 2—2. In connection with these steering wheels, we have shown the ordinary manner of mounting and connecting the same for joint actuation, although it is to be understood that our invention is applicable to any form of steering mechanism. In the present instance the wheels are mounted on stub axles, 3, having vertical pivotal portions, 4, forming with their bearings, 5, the usual steering knuckles, each axle being provided with a steering arm, 6, and said arms being connected by an equalizing rod, 7, in the usual manner. One of the axles is provided with the usual steering lever, 8, to which the usual drag link, 9, is connected in any usual or preferred manner. For the purpose of securing the manual control of the steering mechanism, either with or without the assistance of the actuator, hereinafter described, we have shown the usual steering wheel, 10, secured to the upper end of a steering shaft, 11, provided on its lower end with a worm, 12, engaging the usual worm segment, 13, on a horizontal shaft, 14, provided with a downwardly extending arm, 15, which is connected with the drag link and the piston of the power actuator directly, and is also connected as hereinafter explained, with the reversing valve mechanism of the actuator in such manner that the steering mechanism can be operated either with or without the assistance of the actuator by turning the steering wheel, 10. To this end, the rear end of the drag link, 9, is provided with a sleeve, 16, adapted to accommodate a hardened ball, 17, at the lower end of the arm, 15. The upper side of the sleeve, 16, is provided with a slot, 18, through which the arm, 15, passes, so as to accommodate a slight movement of the arm, 15, with respect to the sleeve. Within the sleeve, 16, we provide a pair of springs, 19, 20, located on opposite sides of the ball, 17, and engaging hardened wear-plates, 21—21, having recessed surfaces to engage the ball, 17. At the rear end of the sleeve, 16, is provided adjusting means in the form of a screw plug, 22, which is screwed into the sleeve so as to compress both of the springs, 19—20, to the same extent and hold the wear-plates, 21, firmly in contact with the ball, 17.

When there is no physical power applied to the steering wheel or other manually operated device, these springs, 19 and 20, are sufficiently strong to maintain the valve mechanism of the actuator, in neutral position with respect to the piston. These springs may be so designed that when compressed to their full extent, they form stops to prevent further movement of the valve actuating mechanism with respect to the piston, and thus prevent injury to the valve mechanism. We prefer to provide each of said springs with a washer provided with a stop (19$^a$—20$^a$, respectively) to engage the adjacent wear-plate and limit the movement of the drag link actuating arm with respect to the sleeve to a predetermined amount, sufficient to insure the full opening of the valve mechanism in either direction, and preventing the valve mechanism from being strained or injured by physical force applied to the steering wheel.

The plug, 22, is held in adjusted position by a lock nut, 23. From the description of the parts thus far given, it will be seen that when the hand wheel, 10, is turned in one direction or the other, the arm, 15, will be moved either forwardly or rearwardly, as the case may be, and that if the resistance of the steering mechanism is not sufficient to cause the compression of the springs, 19 or 20, (according to the direction in which the arm, 15, moves) the steering mechanism will operate under the manual control of the operator exactly as any ordinary steering mechanism operates.

30 represents the actuator cylinder which is supported from the chassis in rear of the arm, 15, and drag link, 9, connected therewith, the cylinder being provided with heads, 31, connected by suitable bolts, 32. In order to permit the piston rod of the actuator to be connected directly to the drag link in alignment with the axis of its pivotal connection with the arm, 15, and to avoid the use of universal joints in valve actuating rod, we prefer to mount the cylinder of the actuator pivotally with respect to the chassis to accommodate the slight variations in the position of the piston rod, to accommodate the arc of travel of the ball, 17, and to this end the cylinder is provided with a heavy supporting hinge casting, 33, connected by a hinge pin, 34, with a hinge member, 35, secured to the chassis, 1, which permits the cylinder to oscillate, as required. 36 represents the actuator piston which is double acting, and is preferably provided with oppositely extending gaskets, as shown. 37 represents the piston rod, which extends through a stuffing box, 38, at the forward end of the actuator cylinder, and has its forward end connected with the sleeve, 16. In this instance, the plug, 22, is provided with an extension, 22ª, to which the forward end of the piston rod is positively connected by a pin, 39. By reason of this construction, it will be observed that the power actuator, when in use, is applied to the drag link in exact alignment with the point at which the power of the hand operated lever, 15, applies power to the drag link.

The actuator piston is provided with a reversing valve mechanism for controlling the admission and eduction of oil, and in this instance we have shown a reversing valve mechanism including rotatable valves. The particular form of valve mechanism herein shown and described is not claimed herein as it is covered by a separate application filed by us November 6, 1924, and given Serial No. 748,293. As shown in the drawings, the piston rod is provided with an inlet passage, 40, and an outlet passage, 41, which passages may be formed by drilling the piston rod longitudinally to provide parallel longitudinal passages therein, as shown, and the piston rod is also provided outside of the cylinder with lateral apertures communicating respectively with the passages, 40 and 41, to which are connected respectively pressure inlet pipe, 42, and the outlet pipe, 43. The central portion of the piston is provided with a passage, 44, and with a parallel passage, 45, said passages forming continuations respectively of the passages 41 and 40 in the piston rod. In line with each of the passages, 44 and 45, is a conical valve seat, 46 and 47, respectively. The valve seat, 46, is provided with an outlet port, 48, opening on the rear side of the piston, and with an outlet port, 49, opening on the opposite or forward side of the piston. The valve seat, 47, is provided with an inlet port, 50, communicating with the cylinder in rear of the piston, and an inlet port, 51, communicating with the cylinder forward of the piston by means of a longitudinal passage, 52, and a transverse or angular passage, indicated at 53. In the conical valve seats are located rotary three-way valves, indicated at 54 and 55, respectively, each of which is provided with a valve stem, 56, suitably mounted in the piston and provided with coil springs, 57, for holding the valves in their conical seats. Each of the valve stems is provided with a pinion, 58, for rotating it, said pinions meshing with racks, 59, on opposite sides of a valve actuating rod, 60, which extends through the rear head of the actuator cylinder, through a stuffing box, 61, therein, for actuating the rotary valves by longitudinal movement of the rod, 60.

Figure 5:
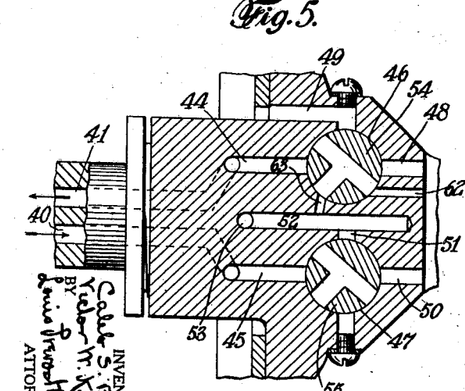
Fig. 5 is an enlarged sectional view on the line 5—5 of Fig. 7.

In Fig. 5, the rotary valves are shown in section in their neutral positions, in which it will be noted that the outlet passage, 44, is not in communication with either of the outlet ports, 48 and 49, and the inlet passage, 45, is not in communication with either of the inlet ports, 50 or 51. Obviously, when the valve is in this position, the actuator is inoperative. In order that the steering mechanism may be operated by hand at all times when the reversing valves are in neutral position, we provide means for establishing a passage through the piston from one side to the other, so that the oil may pass from one end of the cylinder through the piston to the other end of the cylinder, to accommodate movements of the steering mechanism by hand. To this end we have shown herein the valve seat, 46, provided with auxiliary ports, 62 and 63, the former communicating with the cylinder at the rear of the piston, and the latter communicating with the cylinder forward of the piston through the passages, 52, 53, said ports being so located as to be brought into direct communication through the three-way passage in the valve, 54, when the latter is in its neutral or normal position, as clearly shown in Fig. 5. These auxiliary ports may be made of considerable cross sectional area, so as to allow the oil to pass through very freely, in which case the actuator piston would offer very slight resistance when the reversing valves are in neutral position and the steering mechanism is operated by hand. If it is desired to have the piston of the actuator provide a retarding effect on the actuation of the steering mechanism by hand, and also to act to a certain extent as a dash-pot or shock absorber to prevent accidental or sudden movements of the steering mechanism, as might occur if one of the steering wheels struck a large stone or obstruction, or dropped into a deep hole or soft portion of the road, the cross sectional area of the auxiliary ports, 62 and 63, can be reduced to any extent which may be found desirable. Obviously the smaller the cross sectional area of these passages, the greater will be the effect of the piston in retarding the hand operated movements of the steering wheels, and the greater will be its effect as a dash-pot or shock absorber.

We also prefer to provide means for normally holding the reversing valves in their neutral positions so that the valves will be returned to neutral position after each actuation and will be normally held therein in case of the breaking of the valve actuating means hereinafter described. In the present instance, we have shown the valve actuating rod, 60, provided with a pair of coil springs, 64, arranged on opposite sides of a collar, 65, secured to the piston by a cotter pin, 65ª, extending through brackets, 36ª, projecting from one end of the piston, said pin extending through a longitudinal slot, 60ª, in the rod, 60. The springs, 64, are located between said collar and shoulders, 66—67, on the valve actuating rod, 60, see Fig. 11, so that whenever the rod, 60, is moved longitudinally so as to actuate the rotary valves, one or the other of these springs will be compressed and will tend to return the rod and valves to neutral position. Any other suitable mechanism for this purpose may be employed.

Figure 6:
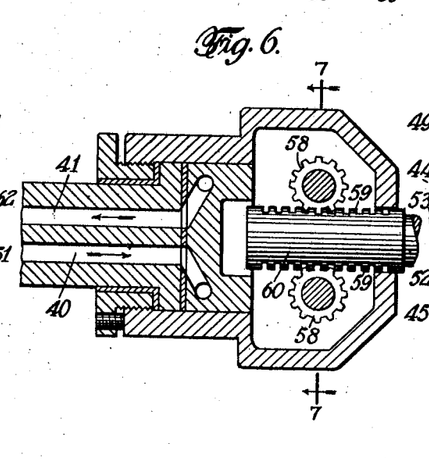
Fig. 6 is an enlarged sectional detail view showing the means for actuating the reversing valve mechanism of the actuator.
Figure 7:
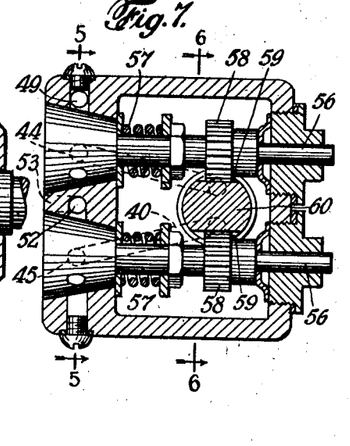
Fig. 7 is another sectional view through the valve mechanism on line 7—7 of Fig. 6.

Referring now to Figs. 5, 6 and 7, it will be understood that if the valve rod, 60, is moved forward or to the left, the valve, 54, will be rotated clockwise, so as to bring the outlet passage, 44, into communication with the outlet port, 49, and close the auxiliary ports, 62 and 63. At the same time the rotary valve, 55, will be moved counter-clockwise, so as to bring the port, 50, into communication with the inlet passage, 45. The pressure liquid will immediately pass into the cylinder in rear of the piston and cause the piston to move forward, the liquid in the cylinder forward of the piston being forced out through the passage, 41, and returned to the sump, as hereinafter explained. The movement of the piston will, therefore, follow the movement of the actuating rod. As soon as the actuating rod stops the continued movement of the piston will cause it to move relatively with respect to the rod, 60, and restore the valves to neutral position. If the rod, 60, is moved rearwardly or to the right, the valve, 54, will be rotated counter-clockwise, so as to connect the outlet port, 48, with the passage, 44, while the valve, 55, will be rotated clockwise so as to connect the inlet port, 51, with the inlet passage, 45, thereby admitting pressure fluid to the cylinder forward of the piston and discharging liquid from the cylinder in rear of the piston and causing the piston to travel backward until the rearward movement of the rod, 60, ceases, when the continued movement of the piston, with respect to the rod, restores the valves to normal position, and reestablishes the through-passage, 62—63.

Figures 1, 1A, 3, 10:
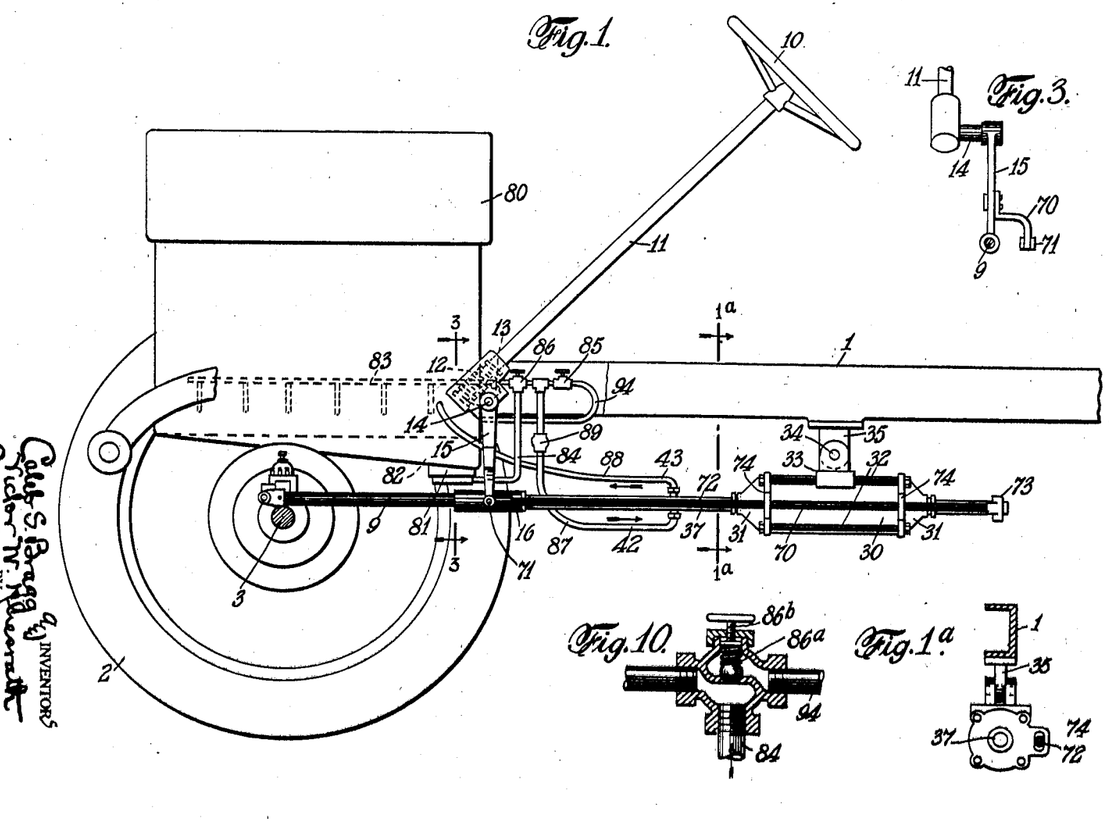

In order to effect the longitudinal movement of the valve actuating rod, 60, we provide the drag link operating lever, 15, with a lateral arm, 70, see Fig. 3, the lower end of which is pivotally connected at 71, with a link bar, 72, extending to the rear end of the valve actuating rod, 60, where it is pivotally connected to a bracket arm, 73, secured to the rod, 60. We prefer to provide the cylinder with suitable slotted guides, indicated at 74, through which this link rod passes, in order that the rod may be prevented from falling to the ground and improperly operating the actuator in case it should become disconnected from the arm, 70. For convenience in attaching the actuator to existing steering mechanism, the arm, 70, may be in the form of a bracket arm and may be secured to the ordinary worm actuated lever, 15, as indicated in Fig. 3. Obviously, it may be made in one piece with the arm, 15, if desired, and in either case the axis of the pivotal connection, 71, should be in line with the center of the ball, 17, at the lower end of the arm, 15.

Referring now to the sleeve, 16, and the oppositely arranged springs, 19 and 20, therein, on opposite sides of the ball, 17, it will be understood that when the hand wheel, 10, is turned, if the resistance offered by the steering wheels and connected mechanism is so slight that the said wheels respond without compression either of the springs, 19 or 20, as the case may be, according to the direction in which the wheel is turned, it is obvious that the piston of the actuator, the valves of which are in neutral position, will simply move in the cylinder displacing a small quantity of oil from one side of the piston to the other, and the rod, 60, will move the piston without altering its position longitudinally with respect thereto. Consequently, the valves will remain in neutral position and the wheels will be steered by hand power without bringing the actuator into operation at all save as it may exert a slight retarding influence and serve as a dash-pot to a greater or less extent, according to the cross sectional area of the through-passage, provided by ports, 62—63. If, however, the resistance to the turning movement of the wheels is sufficiently great as turning slowly and in passing over rutty or uneven ground or soft ground, so that the wheels do not instantly respond to the physical force exerted by the operator on the steering wheel, one of the springs, 19—20, as the case may be, will be compressed by the movement of the arm, 15, thus producing a movement of the valve actuating rod, 60, with respect to the piston, and when this relative movement is sufficient to rotate the valves into either of their operative positions, the piston will instantly respond and proceed to move under the force of the pressure fluid, moving the piston rod and the drag link in the same direction as the physical force exerted by the driver would tend to move it. The power of the actuator is, therefore, immediately added to the force exerted by the driver or operator, to effect the steering movements desired or resist road shocks and relieve him from further muscular exertion. As soon as the piston has moved far enough to effect the desired steering movement, there will be no load on the springs, 19—20, and the springs will restore the valve to neutral position, as heretofore described. If, for any reason the power of the actuator alone should be insufficient to effect the steering movement desired, the physical force of the driver will be added to the power of the actuator in effecting the desired movement.

The particular steering arrangement herein shown and described is not herein claimed as it forms the subject matter of our prior application filed November 1, 1924, and given Serial No. 747,271, hereinbefore referred to.

The pressure fluid which in this instance is lubricating oil, required for the operation of the actuator, is supplied from the forced feed oil system of the internal combustion engine, which provides the source of power for the operation of the actuator when the latter is called into use. In the accompanying drawings, for example, we have indicated more or less diagrammatically the motor or engine at 80, which is an internal combustion engine provided with the usual forced feed lubricating system. This system comprises a pump, 81, which pumps the lubricating oil from a reservoir or sump, indicated at 82, in the bottom of the crank case, through a pipe, 84, or pipes, which supply the oil under pressure to the bearings and to the parts of the engine or motor, as indicated in dotted lines at 83 in Fig. 1. 94 represents a by-pass leading from the pipe, 84, back to the lower portion of the crank case and discharging surplus oil, above the requirements of the circulating system to the oil reservoir, or sump. 86 represents a relief valve, which we term the safety relief valve, which is inserted before the pipe, 84, and the by-pass, 94. This valve is preferably an adjustable spring actuated ball relief valve, shown in detail in Fig. 10, the ball valve being held closed by a spring, 86ª, the tension of which may be adjusted, as by a screw threaded hand operated device, 86ᵇ, for example. A second adjustable relief valve, 85, is preferably arranged in the by-pass, 94, as shown, between the safety relief valve, 86, and the oil reservoir, or sump. This relief valve, 85, is shown in detail in Fig. 8, and likewise is provided with the ball valve having an adjustable spring tension normally holding it in closed position. In practice, we prefer to set the safety relief valve, 86, at a minimum pressure, below which it would not be considered safe to operate the engine, and to set the relief valve, 85, to the maximum pressure which is ordinarily desired to be maintained in the circulating lubricating system. We arrange to take the pressure oil for operating the power actuator from the by-pass between the relief valves, 85 and 86, as indicated in Fig. 1, in which the pressure supply pipe, 42, is so connected, and extends to the passage, 40, in the piston rod, 37, of the actuator.

Figures 2, 4, 8, 9:
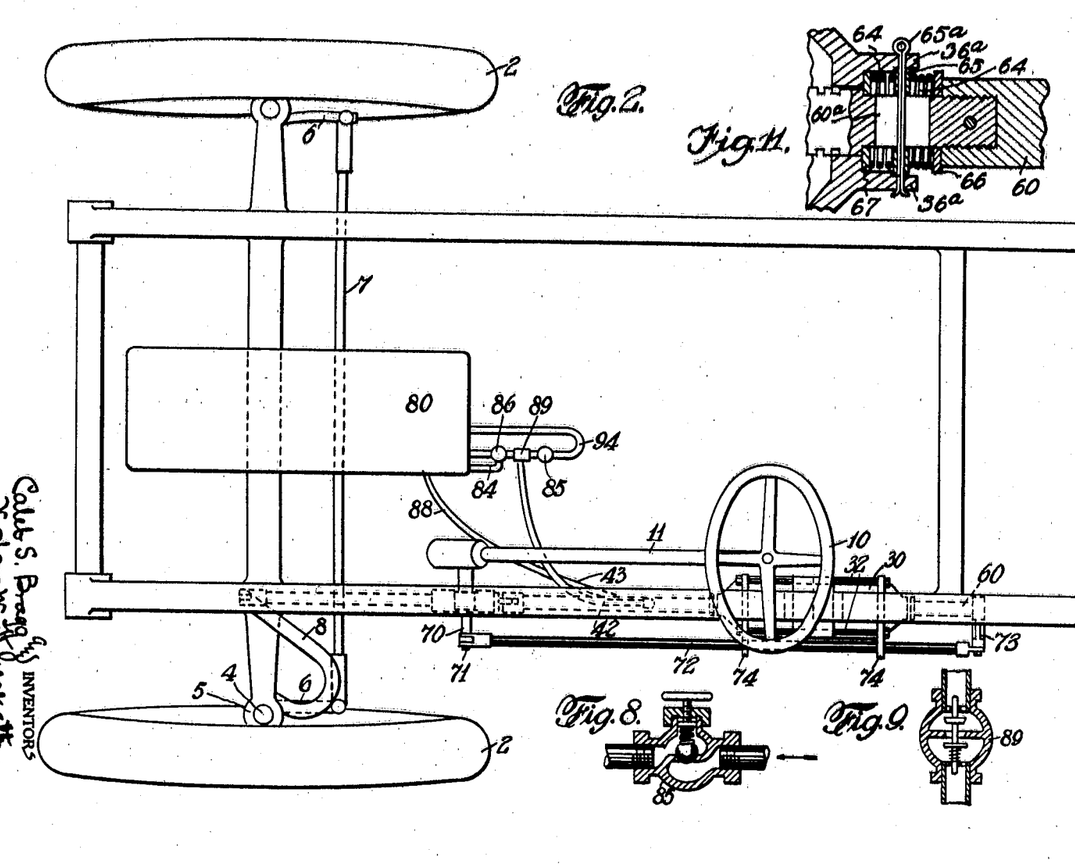
Figure 4:
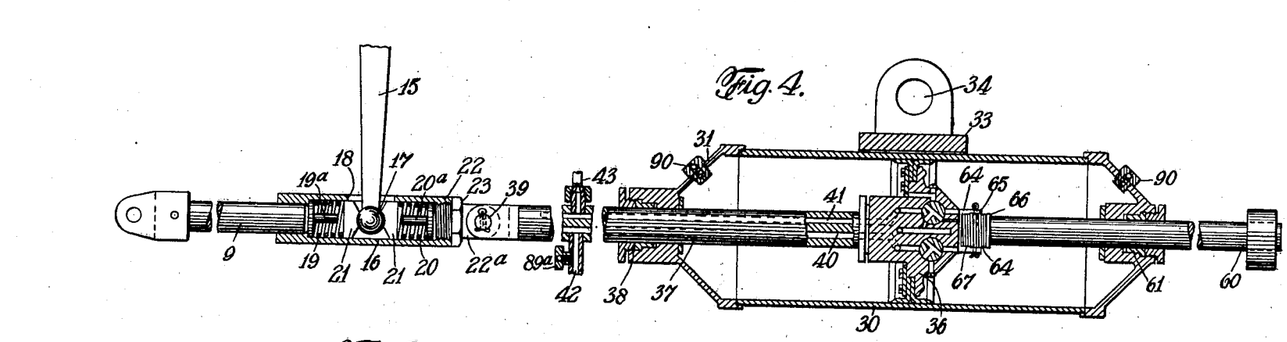
Fig. 4 is an enlarged sectional view illustrating one form of power actuator and its connections with the steering mechanism and the manually operated control therefor.

In order to accommodate the longitudinal movements of the piston rod, it is necessary to insert a flexible section of pipe, indicated at 87, in the pipe, 42, as shown in Fig. 1. The outlet pipe, 43, from the piston rod is connected to the sump or oil reservoir, and is likewise provided with an intermediate flexible portion, 88. It follows from this construction that the pressure in the by-pass, 94, between the valves, 85 and 86, will normally be the maximum pressure maintained in the circulating system, and this is available for the operation of the actuator. As the operation thereof is intermittent, and extends through extremely short periods, only a little oil is withdrawn momentarily from the circulating system to operate the actuator, and by this arrangement the oil which is so withdrawn is excess oil beyond the normal requirements of the circulating lubricating system. As before stated, in case of complete failure of the circulating system, there would be no pressure of oil to operate the actuator, and the steering mechanism in such case can be operated by hand, but will require greater force on the part of the driver or operator. This would instantly warn the driver or operator that the actuator was not functioning and that an examination of the lubricating system would be necessary to avoid injury to the engine. If there is a partial failure only of the lubricating system, so that the pressure in the system falls to or below the pressure for which the safety valve, 86, is set, there would be no pressure available for the actuator and the actuator would not withdraw any oil from the lubricating system, so that there would be no danger of injury to the motor by the attempted use of the actuator. In such case also, the driver's attention would be called to the condition of the oil circulating system by the failure of the actuator to properly function. We also prefer to provide an additional valve, 89, in the pressure fluid pipe, 42, leading to the actuator, which is of the well known type of normally open spring actuated valve, as shown in Fig. 9, for example, in which the valve is held open by a spring so long as pressures are substantially equal on opposite sides of the valve. This valve will be so arranged as to be instantly closed against its spring in case the connection of the pipe, 42, with the actuator should break or leak, thereby shutting off power fluid to the actuator and preventing it from being wasted. If such accident should occur, this would also result in putting the actuator out of operation, but the steering mechanism may nevertheless be operated by hand in the usual manner and the failure of the actuator would be immediately communicated to the driver by the increased amount of power which it would be necessary for him to exert in steering, so that he would have an opportunity to at once ascertain the nature and extent of damage and make the necessary repairs.

In carrying out our invention, we have provided not only a construction which is operable at the will of the operator under any and all conditions, when there is variable pressure to operate the actuator, but also a construction in which means are provided for preventing any improper operation of the actuator in case of accident, and also for preventing the actuator from in any way interfering with the manual operation of the steering mechanism in case the actuator itself becomes incapacitated. For example, if the steering wheel were being operated under conditions sufficiently strenuous to compress one of the springs, 19—20, and set the reversing valves for movement in one direction, and should the supply of motor fluid under pressure fail, as by breaking of the pump or stalling of the engine, the operator could effect the continued movement of the steering mechanism by means of the hand operated mechanism, but as the through passage, or by-pass, of the piston would be closed, the movement of the actuator would force a certain quantity of oil out of the cylinder into the sump, or reservoir, without material resistance, but on the other side of the piston, the oil would not be supplied readily and a partial vacuum might be caused, which would interfere with the ready operation of the steering mechanism by hand under such circumstances. In order to obviate the possibility of the formation of a partial vacuum within the cylinder under such conditions, or any other conditions, we prefer to provide means for venting inwardly both ends of the cylinder. This can be effected in several ways, of which two are illustrated in the accompanying drawings. For instance, the venting means can be applied to the inlet and outlet pipes, 42 and 43 by providing the pipe, 42, with an ordinary check valve, such as a ball check valve, indicated at 89ª in Fig. 4, adapted to open inwardly. The pipe, 43, is preferably connected to the crank case or casing of the engine above the level of the oil therein, as indicated in Fig. 1, so that this vents the pipe, 43, and prevents the formation of a partial vacuum therein. We prefer, however, out of abundant caution, to provide each end of the cylinder with a check valve, such as a ball check valve, as indicated at 90—90, in Fig. 4, for example, so that under the circumstances above referred to, air will enter either end of the cylinder in case there is any danger of forming a partial vacuum, so as not to interfere with the manual operation of the steering mechanism when the reversing valve is in one of its operative positions. Any air so admitted would be expelled in the normal operation of the actuator and if air should accumulate at any time in the cylinder, it can be released by operating the actuator and temporarily opening the auxiliary air valves, 90, until oil is ejected therefrom, but this will not be ordinarily necessary.

What we claim and desire to secure by Letters Patent is:

1. In an automotive vehicle provided with an internal combustion engine, and a forced feed lubricating system therefor, including a pump and oil circulating passages connected therewith, of a power actuator including a cylinder and a piston working therein, an actuated part connected with the piston, reversing valve mechanism, and operative connections from said oil circulating system to said reversing valve mechanism for supplying pressure fluid for the operation of said actuator and a pressure regulating valve interposed between the said lubricating system and the connection leading therefrom to the reversing valve mechanism, constructed to close said connection when the pressure in the lubricating system falls below a predetermined pressure, to prevent the reduction of pressure in the lubricating system below said predetermined pressure by the operation of said actuator.

2. In an automotive vehicle provided with an internal combustion engine, and a forced feed lubricating system therefor, including a pump and oil circulating passages connected therewith, of a power actuator including a cylinder and a piston working therein, an actuated part connected with the piston, and reversing valve mechanism, said oil circulating system including a by-pass for returning excess lubricating oil to the pump without passing through the lubricating passages, and provided with a pressure regulating valve interposed between said by-pass and the pump, and connections between said by-pass and the reversing valve mechanism of the actuator for supplying motor liquid therefor, whereby the supply of motor liquid to the actuator will be excess oil beyond the normal requirements of the engine.

3. In an automotive vehicle provided with an internal combustion engine, and a forced feed lubricating system therefor, including a pump and oil circulating passages connected therewith, of a power actuator including a cylinder and a piston working therein, an actuated part connected with the piston, and reversing valve mechanism, said lubricating system including a by-pass for conducting the excess oil to the oil reservoir, a safety valve in said by-pass adapted to close when the pressure in the circulating system falls below a safe pressure for the engine, and a second safety valve for maintaining a higher normal pressure in the lubricating system of the engine, and connections from a point in said by-pass between said valves to the reversing valve mechanism of the actuator.

4. In an automotive vehicle provided with an internal combustion engine, and a forced feed lubricating system therefor, including a pump and oil circulating passages connected therewith, of a power actuator including a cylinder and a piston working therein, an actuated part connected with the piston, and reversing valve mechanism, said oil circulating system including a by-pass for returning excess lubricating oil to the pump without passing through the lubricating passages, and provided with a pressure regulating valve interposed between said by-pass and the pump, and connections between said by-pass and the reversing valve mechanism of the actuator for supplying motor liquid therefor, whereby the supply of motor liquid to the actuator will be excess oil beyond the normal requirements of the engine, and a valve in said connection, normally held open by a spring and adapted to be closed by pressure in case of a reduction of pressure between said valve and the actuator.

5. In an automotive vehicle provided with an internal combustion engine and a forced feed lubricating system therefor, including a pump, an oil reservoir, oil circulating lubricating passages, a by-pass for returning excess lubricating oil to the reservoir without passing through the lubricating passages, and a pressure regulating valve for said by-pass, of a power actuator including a cylinder, a piston working therein and reversing valve mechanism, an actuated part connected with the piston, pipe connections extending from said by-pass beyond said pressure regulating valve, to said reversing valve mechanism of the actuator, an operator operated device for said reversing valve mechanism, and connections between the operator operated device and the piston of the actuator, containing provision for lost motion sufficient to insure the operation of the reversing valve mechanism, whereby on failure of power, the operation of the operator operated device will transfer the load of the piston and the part to be operated thereby, to the operator and apprize him of the reduction of pressure in the lubricating system.

6. In an automotive vehicle provided with an internal combustion engine and a forced feed lubricating system therefor, including a pump, an oil reservoir, oil circulating lubricating passages, and a by-pass for returning excess lubricating oil to the reservoir without passing through the lubricating passages, a pressure regulating valve interposed between the pump and said by-pass for disconnecting the by-pass from the pump when the pressure in the circulating lubricating system falls below a pre-determined point, below which it is undesirable to operate the engine, a second regulating valve in said by-pass beyond the first mentioned regulating valve, constructed to close when the pressure in the by-pass falls below the predetermined normal pressure which it is desired to maintain in the circulating lubricating system, of a power actuator including a cylinder and a piston working therein, and reversing valve mechanism for the actuator, an actuated part connected with the piston, pipe connections communicating with said by-pass between said regulating valve, and extending to said reversing valve mechanism of the actuator, an operator operated device for the reversing valve mechanism, and connections between the operator operated device and the piston of the actuator, containing provision for lost motion sufficient to insure the operation of the reversing valve mechanism, whereby in case of undue reduction of pressure in the oil circulating system, or failure of pressure in said system, the operation of the operator operated device will transfer the load of the piston and the part to be operated thereby, to the operator and apprize him of the reduction of failure of pressure in the lubricating system.

7. In an automotive vehicle, provided with an internal combustion engine and a forced feed lubricating system therefor, including a pump, an oil reservoir, oil circulating lubricating passages, and a by-pass for returning excess lubricating oil to the reservoir, and a pressure regulating valve for said by-pass, of a power actuator including a cylinder, a piston working therein, and reversing valve mechanism, an actuated part connected with the piston, pipe connections extending from said by-pass to said reversing valve mechanism, an operator operated device for said reversing valve mechanism, and connections between the operator operated device and the piston of the actuator, containing provision for lost motion sufficient to insure the operation of the reversing valve mechanism, said reversing valve mechanism being constructed to close communication with said lubricating system when the valve mechanism is in normal position, and being provided with a communicating by-pass to permit the oil within the cylinder to flow from one side of the piston to the other, when the valve mechanism is in the normal position.

8. In an automotive vehicle provided with an internal combustion engine, and a forced feed lubricating system therefor, including a pump, an oil reservoir, oil circulating lubricating passages, and a by-pass for returning excess lubricating oil to the reservoir, and a pressure regulating valve for said by-pass, of a power actuator including a cylinder, a piston working therein, and reversing valve mechanism, an actuated part connected with the piston, pipe connections extending from said by-pass to said reversing valve mechanism, an operator operated device for said reversing valve mechanism, and connections between the operator operated device and the piston of the actuator containing provision for lost motion sufficient to insure the operation of the reversing valve mechanism, said reversing valve mechanism being constructed to close communication with said lubricating system when the valve mechanism is in normal position, and being provided with a communicating by-pass to permit the oil within the cylinder to flow from one side of the piston to the other, when the valve mechanism is in the normal position, and yielding means for normally maintaining the reversing valve mechanism in normal position.

9. In an automotive vehicle provided with an internal combustion engine and a forced feed lubricating system therefor, including an oil reservoir, a pump, and oil circulating passages connected therewith, of a power actuator comprising a cylinder, a piston therein, and reversing valve mechanism, means for connecting the piston with an actuated part, inlet connections from said oil circulating system, and the said reversing valve mechanism, a pressure regulating valve constructed to close said inlet connection when the pressure in the lubricating system falls below a predetermined point, and outlet connections from said valve mechanism for said reservoir for returning oil thereto from the actuator.

10. In an automotive vehicle provided with an internal combustion engine and a forced feed lubricating system therefor including an oil reservoir, a pump, an oil passage connected therewith, a power actuator comprising a cylinder, a piston therein, and reversing valve mechanism, means for connecting the piston with a part to be actuated, inlet connections from said oil passage to said valve mechanism, including a pressure controlled element constructed to insure an adequate supply of oil to said lubricating system, outlet connections from said valve mechanism to said reservoir, and means for returning surplus oil from said oil passage above the requirements of the lubricating system to the reservoir.

11. In an automotive vehicle provided with an internal combustion engine and a forced feed lubricating system therefor including an oil reservoir, a pump, an oil passage connected therewith, a power actuator comprising a cylinder, a piston therein, and reversing valve mechanism, means for connecting the piston with a part to be actuated, inlet connections from said oil passage to said valve mechanism, outlet connections from said valve mechanism to said reservoir, a pressure valve interposed between said oil passage and the said valve mechanism, constructed to close communication therebetween when the pressure in the lubricating system falls below a predetermined point, and means for returning surplus oil from said oil passage beyond the requirements of the lubricating system to the said reservoir.

In testimony whereof we affix our signatures.

CALEB S. BRAGG.
VICTOR W. KLIESRATH.